US 6,587,685 B2

(12) United States Patent
Mittal et al.

(10) Patent No.: US 6,587,685 B2
(45) Date of Patent: Jul. 1, 2003

(54) APPARATUS, AND AN ASSOCIATED METHOD, BY WHICH TO PROVIDE OPERATION PARAMETERS TO A MOBILE STATION

(75) Inventors: Gaurav Mittal, San Diego, CA (US); Glen Mathews, San Diego, CA (US); Patrik Gustafsson, Foster City, CA (US); Paul Spadafora, San Diego, CA (US)

(73) Assignee: Nokia Corporation, Espoo (FI)

( * ) Notice: Subject to any disclaimer, the term of this patent is extended or adjusted under 35 U.S.C. 154(b) by 47 days.

(21) Appl. No.: 09/844,179

(22) Filed: Apr. 27, 2001

(65) Prior Publication Data
US 2002/0160763 A1 Oct. 31, 2002

(51) Int. Cl.$^7$ .......................... H04M 3/00; H04M 1/66; H04M 1/68; H04M 3/16
(52) U.S. Cl. ..................... 455/419; 455/418; 455/410
(58) Field of Search ................. 455/419, 418, 455/410, 411, 412; 709/466, 560, 561, 551, 217, 218, 219, 227, 230, 246

(56) References Cited

U.S. PATENT DOCUMENTS 5,524,135 A * 6/1996 Mizikovsky et al. ....... 455/419
6,148,197 A * 11/2000 Bridges et al. ............. 455/419
6,336,090 B1 * 1/2002 Chou et al. ................. 704/231
2002/0068570 A1 * 6/2002 Abrol et al. ................ 455/438
2002/0081995 A1 * 6/2002 Leppinen et al. ........... 455/412

* cited by examiner

Primary Examiner—Nay Maung
Assistant Examiner—Raymond Persiuo
(74) Attorney, Agent, or Firm—Milan I. Patel

(57) ABSTRACT

Apparatus, and an associated method for downloading operation parameters to a mobile station by way of a radio link. The operating parameters include, for instance, preferred roaming list, number assignment module, enhanced variable rate coder, IP address, access point setup parameters, and the like, to be used during operation of the mobile station. Values of the operational parameter are input by way of the user interface to a server coupled to the network infrastructure of the communication system in which the mobile station is operable. Values of the operational parameters are encoded and routed to the mobile station by way of the network infrastructure of the communication system and a radio link formed with the mobile station. Once detected at the mobile station, the values are stored at a storage element, and later retrieved during subsequent operation of the mobile station.

17 Claims, 4 Drawing Sheets

APPARATUS, AND AN ASSOCIATED METHOD, BY WHICH TO PROVIDE OPERATION PARAMETERS TO A MOBILE STATION

The present invention relates generally to a manner by which to maintain updated operation parameters at a mobile station pursuant to which the mobile station, such as a cellular mobile station, is operable. More particularly, the present invention relates to apparatus, and an associated method, for downloading the operational parameters to the mobile station by way of a radio link. The operational parameters are downloaded in a secured manner, utilizing nonproprietary techniques, such as a synchronization markup language (Sync ML). The need otherwise to deliver the mobile station to a service center to receive the operational parameters is obviated as the downloading of the operational parameters is instead performed remotely by way of the radio link.

BACKGROUND OF THE INVENTION

The use of communication systems through which to communicate data between separate, spaced-apart locations is a necessary adjunct of modern society. Many different types of communication systems have been developed for use to effectuate communication of data between sending and receiving stations positioned at the separate, spaced-apart locations.

Advancements in communication technologies have made possible both improvements to existing types of communication systems as well as implementations of new types of communication systems. Communication of increased amounts of data, at increased rates, between communication stations positioned at locations at which communication previously could not have been effectuated are now possible due to such improvements.

Radio communication systems are exemplary of communication systems which have benefited from the advancements in communication technologies. In a radio communication system, communication channels formed between sending and receiving stations of the system are defined upon radio links extending between the sending and receiving stations. Communication channels upon which data is communicated are defined upon radio links. Wireline connections, conventionally required in a wireline communication system upon which to define communication channels, are therefore obviated in a radio communication system. Use of a radio communication system, as a result, inherently permits an increase in communication mobile in contrast to the use of conventional, wireline communication systems. As fixed connections are not required to be formed between the sending and receiving stations of a radio communication system, relative movement between the sending and receive stations while still permitting communications to be effectuated therebetween is possible.

A cellular communication system is a type of radio communication system which has achieved high levels of usage. The infrastructure of various types of communication systems have been installed over wide geographical areas and provide for radio communication with mobile stations operable in the various types of cellular communication systems.

Upgrades to, and other revisions of, cellular communication systems are made possible by additional advancements in communication technologies. Various of such upgrades, and other revisions, require changes to be made in operational parameters pursuant to which a mobile station operable in a cellular communication system operates. To take advantage of the upgrade or revision, or, in some instances, to be operable subsequent to the upgrade or revision, necessitates that changes be made to the operational parameters at the mobile station.

The operational parameters which might be changed, include, for instance, parameters associated with a preferred roaming list, a parameter associated with a new number assignment module associated with the mobile station, a new value of a parameter associated with an enhanced variable rate coder, a parameter associated with a changed IP (internet protocol) address associated with the mobile station, and an access point setup parameter list. Additional parameters might also be susceptible to change or revision.

One conventional manner by which to effectuate the change of an operational parameter at the mobile station is to require that the mobile station be returned to a service center at which reprogramming of the mobile station is carried out to effectuate the update or other revision of the operating parameter, as appropriate. The requirement that the mobile station be returned to a service center is inconvenient to the user of the mobile station, reducing user-satisfaction of the service provider. Additionally, the need for the service provider to maintain a service center at which users of the mobile stations return the mobile stations to have the operating parameters updated or revise necessitates significant investment and expense by the operator.

Alternately, use of existing network elements, such as those set forth in interim standards IS-683 (OTASP) and IS-683(a) (OTAPA) are utilized. These manners by which to update or revise the operating parameters of the mobile stations are limited due to their complexity or proprietary nature.

An improved manner by which better to update or otherwise revise operating parameters at a mobile station pursuant to which the mobile station is operable would therefore be advantageous.

It is in light of this background information related to maintaining operating parameters at a mobile station that the significant improvements of the present invention have evolved.

SUMMARY OF THE INVENTION

The present invention, accordingly, advantageously provides apparatus, and an associated method, by which to maintain updated operational parameters at a mobile station pursuant to which the mobile station, such as a cellular mobile station, is operable.

Through operation of an embodiment of the present invention, a manner is provided by which to download the operational parameters to the mobile station by way of a radio link. The operational parameters are encoded so that downloading of the operational parameters is effectuated in a secured manner. Non proprietary techniques, such as use of a synchronization markup language engine by which to encode the operation parameters, are utilized.

Because a radio link is utilized upon which to communicate the operational parameters to the mobile station, the need otherwise to deliver the mobile station to a service center at which the operational parameters would conventionally otherwise be downloaded to the mobile station. And, through the use of nonproprietary techniques, complexities otherwise resulting from the use of conventional manners by which to download, by way of radio links, the operational parameters to the mobile station, are obviated.

In one aspect of the present invention, apparatus is provided for an operator by which to communicate operational parameters to a mobile station. When an operational parameter, already stored at a mobile station, is to be updated, or another operational parameter is to be provided to a mobile station, indications of the operational parameter are provided to a server associated with the operator. The server is connected to a packet data network, such as the internet backbone, and the indications are provided to the server by way of an interface located at the server or elsewhere, such as by way of the packet network.

The server includes a synchronization markup language (Sync ML) engine to which indications of the updated, or other, operational parameter are provided. The Sync ML engine forms a Sync ML-formatted message which is routed to the packet data network through a radio access network portion of the radio communication system of which the mobile station forms a portion. The Sync ML-formatted message is sent upon a communication channel defined upon a radio link formed between the radio access network portion and the mobile station.

Once the message is detected at the mobile station, the values of the operational parameters are recovered, thereafter to be utilized at the mobile station pursuant to subsequent operations of the mobile station.

In another aspect of the present invention, a manner is provided for the mobile station to detect, and store, the operational parameters transmitted thereto. When the values of the operational parameters are formatted to form a Sync ML message, the mobile station includes a Sync ML engine operable to detect, and operate upon, the detected message. Indications of the values of the operational parameters are stored at a storage element of the mobile station. Thereafter, the values are retrieved, as appropriate, pursuant to subsequent operation of the mobile station.

The operational parameters comprise, for instance, parameters associated with a preferred roaming list (PRL), a number assignment module (NAM), an enhanced variable rate coder (EVRC), an IP (internet protocol) address associated with the mobile station, and access point setup parameters. Other operational parameters are analogously also communicated to the mobile station pursuant to operation of an embodiment of the present invention.

In these and other aspects, therefore, apparatus, and an associated method, is provided for a radio communication system, having a mobile station operable pursuant to at least a first selected operational parameter. The mobile station is capable of communicating with network infrastructure of the radio communication system. A download-parameter signal is generated at the network infrastructure for communication to the mobile station. A download-parameter signal generator is coupled to receive indications of a value to be associated with the at least the first selected operational parameter. The download-parameter signal generator is selectably operable to generate the download-parameter signal. The download-parameter signal is of values representative of the values representative of the value associated with the at least first selected operational parameter, and the download-parameter signal is encoded to limit detection of the values thereof during communication therefrom to the mobile station.

In these and further other aspects, further apparatus, and associated method, is provided for the mobile station for storing the values representative of the value associated with the at least the first selected operational parameter. A download-parameter signal detector is coupled to receive indications of the download-parameter signal generated by the download-signal generator once communicated to the mobile station. The download-signal detector detects the values representative of the first selected operational parameter. A storage element is coupled to the download-parameter signal detector. The storage element stores the values detected by the download-parameter signal detector.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
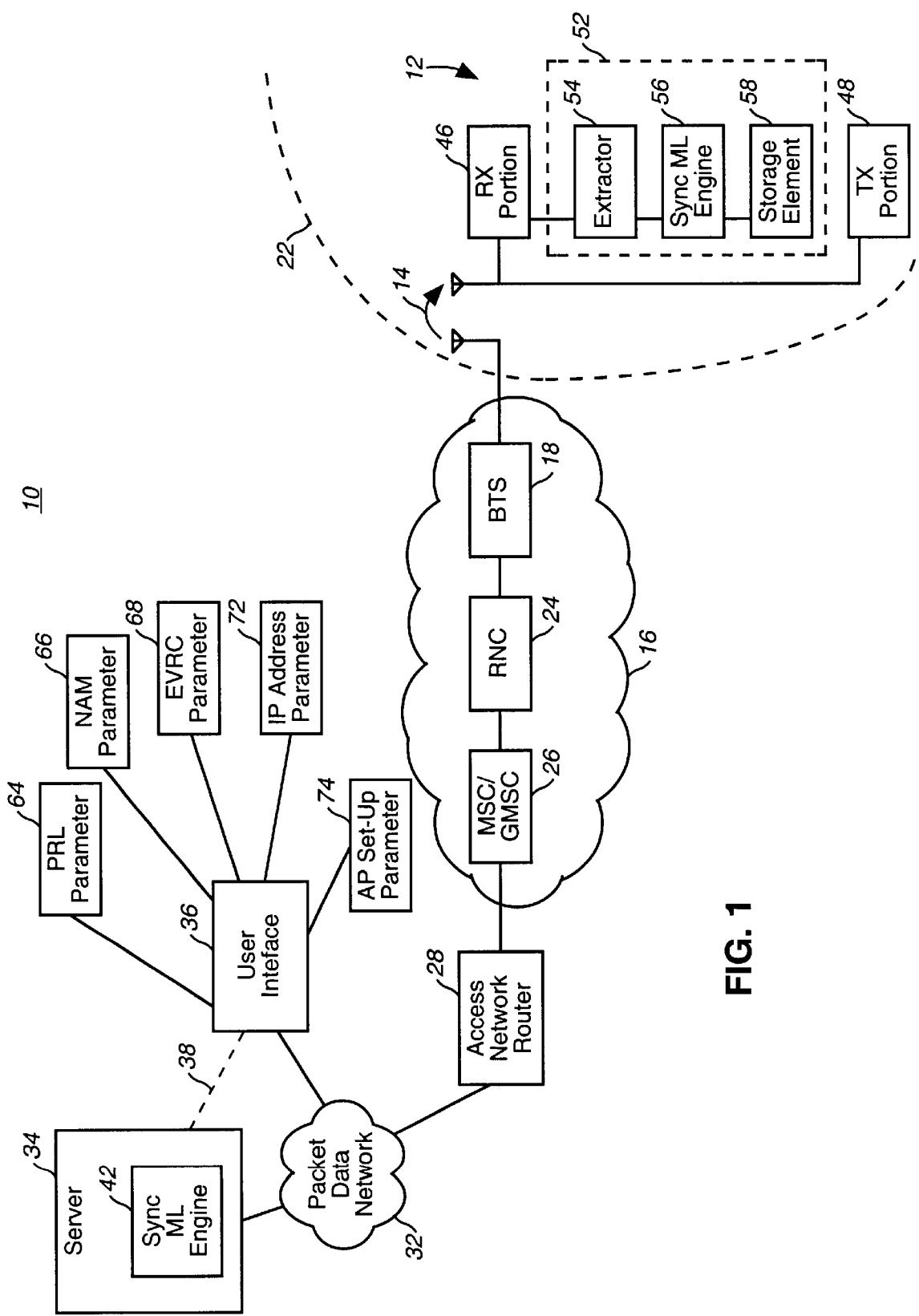
FIG. 1 illustrates a functional block diagram of a communication system in which an embodiment of the present invention is operable.

Referring first to FIG. 1, an exemplary communication system shown generally at 10, provides for radio communications with a mobile station 12, by way of a radio link 14. In the exemplary implementation shown in the figure, the communication system 10 is formed of a CDMA (code-division, multiple-access), cellular communication system, such as a system generally operable pursuant to a so-called 3G (third-generation) standard. While the following description shall describe operation of the exemplary implementation of the communication system 10 in which the communication system 10 comprises a CDMA, cellular communication system, it should be understood that operation of an embodiment of the present invention is similarly implementable in other types of communication systems.

Here, the communication system includes network infrastructure having a radio access network (RAN) portion 16. The radio access network portion includes a plurality of base transceiver stations (BTSs), of which the base transceiver station 18 is representative. Each base transceiver station defines a coverage area referred to as a cell. When a mobile station is positioned within a cell defined by a base transceiver station, communications effectuated between the network infrastructure and the mobile station are generally effectuated with the base transceiver station which defines the cell in which the mobile station is positioned. Here, a cell 22 is defined by the base transceiver station 18, and the mobile station 12 is positioned within the cell 22, thereby to communicate with the base transceiver station by way of communication channels defined upon the radio link 14.

The base transceiver station is coupled to a radio network controller (RNC) 24. Typically a group of base transceiver stations are coupled to a single radio network controller. The radio network controller is operable, amongst other things, to control operation of the base transceiver stations coupled thereto. Operations controlled by the controller, include, for instance, channel allocations for communication sessions with mobile stations positioned within cells defined by the base transceiver stations coupled thereto.

The radio network controller is coupled, in turn, to a mobile switching center/gateway mobile switching center (MSC/GMSC) 26. The switching center forms switching operations for effectuate of both circuit-switched and packet-switched communications.

The figure illustrates packet-switched circuit portions of the communication system. Here, therefore, the switching center 26 is coupled to an access network router 28. The router is coupled to a packet data network backbone 32, such as the internet backbone.

Additional devices are connected, in conventional manner, to the packet data network. Here, a server 34 is coupled to the packet data network. And, a user interface 36 is also coupled to the packet data network. In the exemplary implementation in which the packet data network is formed of the internet backbone, the user interface 36 forms a web-enabled browser, and the server is identified by an internet address, such as an IP (internet protocol) address. Through appropriate actuation of the user interface, the server 34 is accessible by way of the packet data network. In another implementation, the user interface is directly connected to the server is such connection is indicated by the line 38 shown in dash.

The server 34 is operable to generate messages representative of operational parameters to be downloaded to the mobile station. Here, the server includes a synchronization message language (Sync ML) engine 42 operable to receive indications of operational parameters by way of the user interface 36. In the implementation in which the user interface is coupled to the server by way of the packet data network, the indications of the operational parameters are provided to the Sync ML engine by appropriate routing of the indications by way of the packet data network. And, when the user interface is directly connected to the server 34, the indications are provided directly to the server and the Sync ML engine forming a portion thereof. The Sync ML engine is operable to generate a synchronization markup language-formatted message, a binary encoded message which is, subsequent to its formation, routed through the packet data network. The message is further routed through the access network router and the radio access network portion, thereafter to be sent upon communication channels defined upon the radio link 14 to the mobile station.

The mobile station 12 is here shown to include a receive portion 46, a transmit portion 48 and a control element 52. The receive portion of the mobile station is operable to detect and to operate upon signal transmitted to the mobile station upon the radio link 14. And, the transmit portion 48 is operable to generate uplink signals to be transmitted upon uplink channels defined upon the radio link 14 to the network infrastructure.

Here, the control element 52 is shown to include an extractor 54 coupled to the receive portion 46. The extractor is operable to extract values of the operating parameters contained in messages originated at the server 34 and routed to the mobile station by way of the network infrastructure of the communication system. In the exemplary implementation in which the message forms a synchronization markup-formatted message, the control element 52 includes a synchronization markup language (Sync ML) engine 56 coupled to the extractor. The engine 56 is operable to operate upon the synchronization markup language-formatted message received at the mobile station to recover, thereby, the values of the operational parameters contained therein.

The control element is further shown to include a storage element 58 coupled to the synchronization markup language 56. The storage element includes memory locations at which the values representative of the operating parameters recovered by the synchronization markup language engine are stored. Once stored, the values are later retrieved during subsequent operation of the mobile station, and values of the operating parameters are used pursuant to operation of the mobile station.

The operating parameters, updates, or other values, of which indications thereof are provided by the user interface to the server are formed of any of various parameters. For instance, and as indicated by the block 64, values of preferred roaming list (PRL) parameters are amongst operational parameters entered at the user interface and applied to the server 34. When, for instance, the operator of the cellular communication systems forms a new carrier roaming agreement with a roaming-service provider, the preferred roaming list is updated at the mobile station by sending new PRL parameters.

Analogously, and as indicated by the block 66, values of number assignment module (NAM) parameters are also amongst the operating parameters entered at the user interface and supplied to the server 34. When, for instance, area-code portions of a number assignment module assigned to a mobile station is changed, updated NAM parameters including an updating area-code portion are entered at the user interface and supplied to the server. A message generated at the server and routed to the mobile station permits the parameter to be updated at the mobile station.

Analogously, additional parameters, such as enhanced variable rate coder (EVRC) parameters, indicated by the block 68, to be used during coding operation at the mobile station IP (internet protocol) address parameters, indicated by the block 72, to be used for updating the IP address by which the mobile station is to be identified, and access point set-up parameters, indicated by the block 74 are all further representative of parameters entered by way of the user interface, provided by the server 34 and of which messages are routed to the mobile station to update the operating parameters thereof. Additional, and other, parameters can similarly be entered at the user interface and provided to the server 34 to form a message downloadable to the mobile station.

Figure 2:
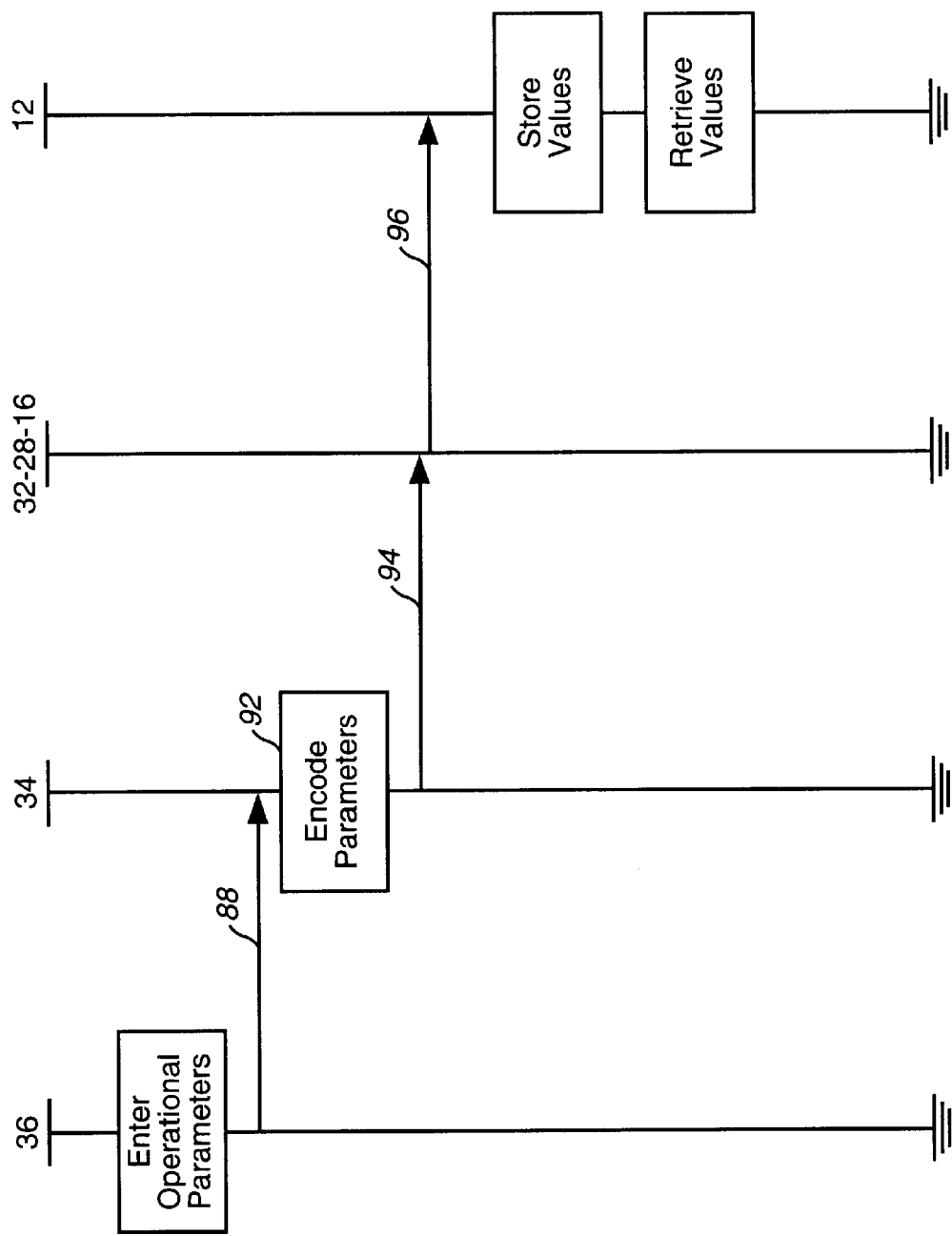
FIG. 2 illustrates a message sequence diagram showing signaling of the various elements of the communication system shown in FIG. 1 during operation of an embodiment of the present invention.

FIG. 2 illustrates a message sequence diagram, shown generally at 84, representative of the signaling generated during operating of an embodiment of the present invention in the communication system 10, shown in FIG. 1, to download updated, or other, operating parameters to the mobile station 12. First, and as indicated at the block 86, one or more operating parameters which are to be downloaded to the mobile stations are entered by way of the user interface 36. Once entered, indications of the entered values are routed, and as indicated by the segment 88, to the server 34.

At the server 34, and as indicated by the block 92, the values of the operating parameter are encoded, such as by the synchronization markup language engine 42, shown in FIG. 1. Once encoded to form a downloadable message, the message is routed, indicated by the segment 94, through the packet data network, the access network router, and the radio access network portion 16. Then, and as indicated by the segment 96, the message is sent upon the radio link to the mobile station 12.

When the message is detected by the mobile station, the values of the operating parameter are recovered and stored, indicated by the block 98 at the storage element 58, shown in FIG. 1, of a mobile station. Thereafter, as appropriate, and as indicated by the block 102, the stored values are retrieved and used during subsequent operation of the mobile station.

Figure 3:
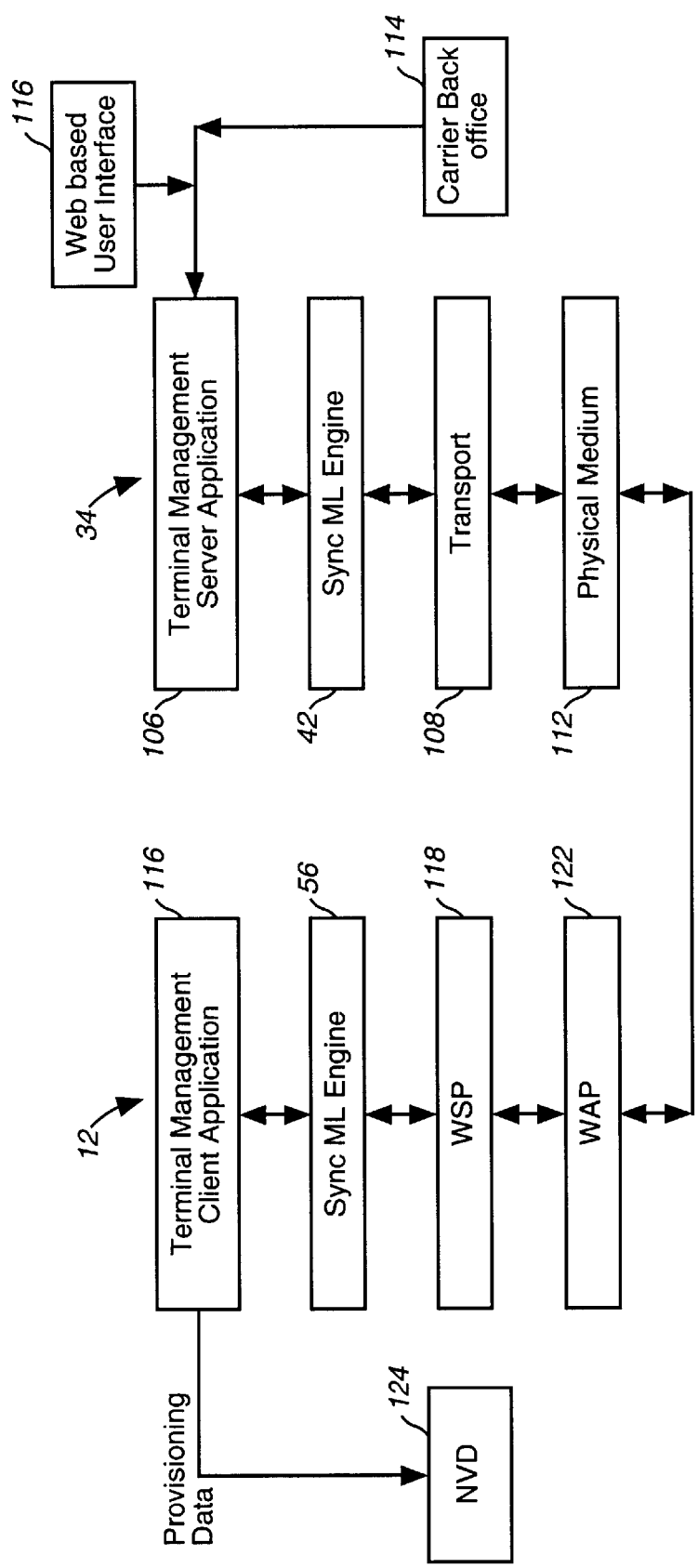
FIG. 3 illustrates a logical-layer representation of the communication system shown in FIG. 1.

FIG. 3 again illustrates the communication system 10, here shown in terms of logical layers. The server 34 is shown to include a terminal management server application layer 106 positioned above the sync ML engine 42. A transport layer 108 is positioned beneath the sync ML engine, and a physical medium layer 112 is positioned beneath the transport layer. The user interface 36, here a web-based interface is also shown in the Figure. And, a carrier back office location 114 is further represented in the figure.

The mobile station 12 is shown to include a terminal management client application layer 116 positioned above the sync ML engine 56. A WSP layer 118 is positioned beneath the sync ML engine, and a WAP layer 122 is positioned beneath the WSP layer. An NVD element 124 is further shown in the figure to which provisioning data is provided by the application layer 116.

Figure 4:
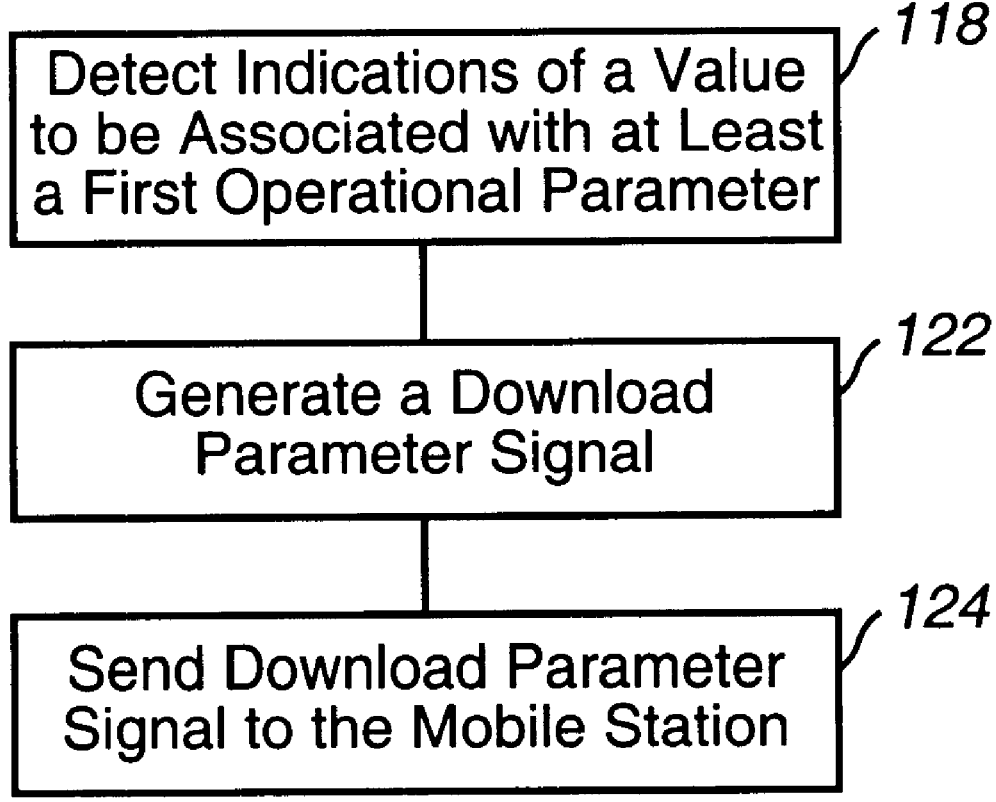
FIG. 4 illustrates a method flow diagram listing the method of operation of an embodiment of the present invention.

FIG. 4 illustrates a method flow diagram, shown generally at 117, of the method of operation of an embodiment of the present invention. The method generates a download-parameter signal for communication to a mobile station operable in a radio communication system.

First, and as indicated by the block 118, indications of a value to be associated with at least a first selected operational parameter is detected at the network infrastructure.

Then, and as indicated by the block 122, a download-parameter signal of values representative of the value associated with the at least first selected operational parameter is generated. The download-parameter signal is encoded to limit detection of the values thereof, during communication to the mobile station. Then, and as indicated by the block 124, the download-parameter signal is sent to the mobile station. Once detected at the mobile station, the values contained in the signal are extracted and stored at a storage element of a mobile station. The values stored at the storage element are subsequently retrieved and used, as appropriate, during subsequent operation of the mobile station.

Thereby, a manner is provided by which to download operational parameters to a mobile station by way of a radio link. The operational parameters are downloaded in a secured manner, utilizing nonproprietary techniques, thereby to permit a remote downloading of the operational parameters while maintaining secured communications to the mobile station.

The previous descriptions are of preferred examples for implementing the invention, and the scope of the invention should not necessarily be limited by this description. The scope of the present invention is defined by the following claims.

What is claimed:

1. In a radio communication system having a mobile station operable pursuant to at least a first selected operational parameter, the mobile station capable of communicating with network infrastructure of the radio communication system, an improvement of apparatus for the network infrastructure for generating a download-parameter signal for communication to the mobile station, said apparatus comprising:
a Sync Mark-Up Language (Sync ML) engine coupled to receive indications of a value to be associated with the at least the first selected operational parameter, said Sync Mark-Up Language engine selectably operable to generate the download-parameter signal, the download-parameter signal formatted in Sync ML form and of values representative of the value associated with the at least the first selected operational parameter, the download-parameter signal formatted in the Sync ML form thereby to be encoded to limit detection of the values thereof during communication therefrom to the mobile station.

2. The apparatus of claim 1 wherein the download-parameter signal, formatted in the Sync ML form, generated by said download-parameter signal generator, and encoded to limit detection of the values thereof, is binary-encoded.

3. The apparatus of claim 2 wherein the Sync ML form into which the download-parameter signal generated by said Sync Mark-Up Language engine is formatted includes the indications of the value associated with the at least the first selected operational parameter represented as Synchronization Mark-up language (Sync ML) text.

4. The apparatus of claim 3 further comprising an input actuator coupled to said Sync Mark-Up Language engine and selectably actuable at least to provide the indications of the value associated with the at least the first selected operation parameter.

5. The apparatus of claim 4 wherein the network infrastructure includes a network backbone portion and a radio access network portion and wherein an operator-server is coupled to the network backbone, said Sync ML engine embodied at the operator-server.

6. The apparatus of claim 5 wherein said input actuator is embodied at the operator-server.

7. The apparatus of claim 1 wherein the first selected operational parameter of which the values of the download-parameter signal generated by said Sync Mark-Up Language engine are representative comprises a preferred roaming list parameter.

8. The apparatus of claim 1 wherein the first selected operational parameter of which the values of the download-parameter signal generated by said Sync Mark-Up Language engine are representative comprises a number assignment module (NAM) parameter.

9. The apparatus of claim 1 wherein the first selected operational parameter of which the values of the download-parameter signal generated by said Sync mark-Up Language engine are representative comprises an enhanced variable rate coder (EVRC) parameter.

10. The apparatus of claim 1 wherein the mobile station is identified by an IP address and wherein the first selected operational parameter of which the values of the download-parameter signal generated by said Sync Mark-Up Language engine are representative comprises an IP address parameter.

11. The apparatus of claim 1 wherein the first selected operational parameter of which the values of the download-parameter signal generated by said Sync Mark-Up Language engine are representative comprises an access point setup parameter list.

12. In a radio communication system of claim 1, a further improvement of apparatus for the mobile station for storing the values representative of the value associated with the at least the first selected operation parameter, said apparatus comprising:
a download-parameter signal detector coupled to receive indications of the download-parameter signal generated by said Sync Mark-Up Language engine, once communicated to the mobile station, said download-parameter signal detector for detecting the values representative of the first selected operation parameter; and
a storage element coupled to said download-parameters signal detector, said storage element for storing the values detected by said download-parameter signal detector thereat.

13. The apparatus of claim 12 wherein said download-parameter signal detector comprises a Sync ML detector engine for operating upon the download-parameter signal formatted in the Sync ML form.

14. In a method for communicating in a radio communication system having a mobile station operable pursuant to at least a first selected operational parameter, the mobile station capable of communicating with network infrastructure of the radio communication system, an improvement of a method for generating a download-parameter signal for communication to the mobile station, said method comprising:

detecting, at the network infrastructure, indications of a value to be associated with the at least the first selected operational parameter;

generating a download-parameter signal, formatted in Sync ML form, of values representative of the value associated with the at least the first selected operational parameter detected during said operation of detecting, the download-parameter signal formatted in the Sync ML form, thereby to be encoded to limit detection of the values thereof during communication therefrom to the mobile station; and sending the download-parameter signal, generated during said operation of generating, to the mobile station.

15. The method of claim 14 further comprising the operations of:

receiving the download-parameter signal at the mobile station;

extracting the value of the download-parameter signal associated with the at least the first selected operational parameter; and storing the value, extracted during said operation of extracting, at the mobile station.

16. The method of claim 15 further comprising the operation of using the value stored during said operation of storing during subsequent operation of the mobile station.

17. In a radio communication system having a mobile station operable pursuant to at least a first selected operational parameter, the mobile station capable of communicating with network infrastructure of the radio communication system, an improvement of apparatus for the mobile station for maintaining values representative of the first selected operation parameter, said apparatus comprising:

a Sync Mark-Up Language engine coupled to receive indications of a download-parameter signal communicated thereto, the download-parameter signal formatted in Sync Mark-Up Language form and of values representative of the value associated with the at least the first selected operational parameter, the download-parameter signal formatted in the Sync Mark-Up Language form thereby to be encoded to limit detection of the values thereof during communication to the mobile station; and a storage element coupled to said Sync Mark-Up Language engine, said storage element for storing the values, detected by said Sync Mark-Up Language engine thereat.

\* \* \* \* \*